United States Patent [19]

Kaneko

[11] Patent Number: 4,945,540
[45] Date of Patent: Jul. 31, 1990

[54] GATE CIRCUIT FOR BUS SIGNAL LINES

[75] Inventor: Kouichi Kaneko, Itami, Japan

[73] Assignee: Mitsubishi Denki Kabushiki Kaisha, Tokyo, Japan

[21] Appl. No.: 152,784

[22] Filed: Feb. 5, 1988

[30] Foreign Application Priority Data

Jun. 30, 1987 [JP] Japan .................. 62-164303

[51] Int. Cl.$^5$ .............................. G06F 11/00
[52] U.S. Cl. .................. 371/57.1; 364/186; 371/22.5
[58] Field of Search ............ 371/48, 57, 52, 57.1, 371/22.5; 364/186

[56] References Cited

U.S. PATENT DOCUMENTS 3,860,908 1/1975 Stratton, III .................. 371/57

FOREIGN PATENT DOCUMENTS 214148 10/1985 Japan ........................ 371/57

OTHER PUBLICATIONS

David F. Stout et al., *Handbook of Microcircuit Design and Application*, 1987, McGraw-Hill Pub., pp. 11-3, 16-11, 27-29, 27-30.
Curlander, P., "Indicating Control-Circuit Detected Errors", IBM Technical Disclosure Bulletin, vol. 19, No. 8, Jan. 1977, pp. 2935-2936.

Primary Examiner—Jerry Smith
Assistant Examiner—Stephen M. Baker
Attorney, Agent, or Firm—Townsend & Townsend

[57] ABSTRACT

A failure detecting gate circuit for bus signal lines. The gate circuit include gate elements connected to each bus line and controlled by control signal, and a processing unit which controls any one of the gate elements. The processing unit operates to switch the gate elements to an "ON" state when the control signals are supplied to the gate elements of each gate. The failure detecting circuit outputs an indication signal of a failure condition in the processing unit. This occurs when control signals are supplied, such that at least two gate elements are to be switched to the "ON" state simultaneously. The improvement of the present invention over previous devices is a multiplexer which outputs one of two signals indicating either a failure condition or a normal signal provided by the microcontroller.

5 Claims, 5 Drawing Sheets

* UART (UNIVERSAL ASYNCHRONOUS RECIEVER TRANSMITTER)

FIG. 2

| ADDRESS | MEMORIZED CONTENTS OF ROM | A1 (C1) | A2 (C2) | A3 (C3) |
|---|---|---|---|---|
| 0 | 0 | 0 | 0 | 0 |
| 1 | 0 | 0 | 0 | 1 |
| 2 | 0 | 0 | 1 | 0 |
| 3 | 1 | 0 | 1 | 1 |
| 4 | 0 | 1 | 0 | 0 |
| 5 | 1 | 1 | 0 | 1 |
| 6 | 1 | 1 | 1 | 0 |
| 7 | 1 | 1 | 1 | 1 |

⟨ANOTHER LOGIC OF ROM⟩

⟨CHECK TERMINAL⟩

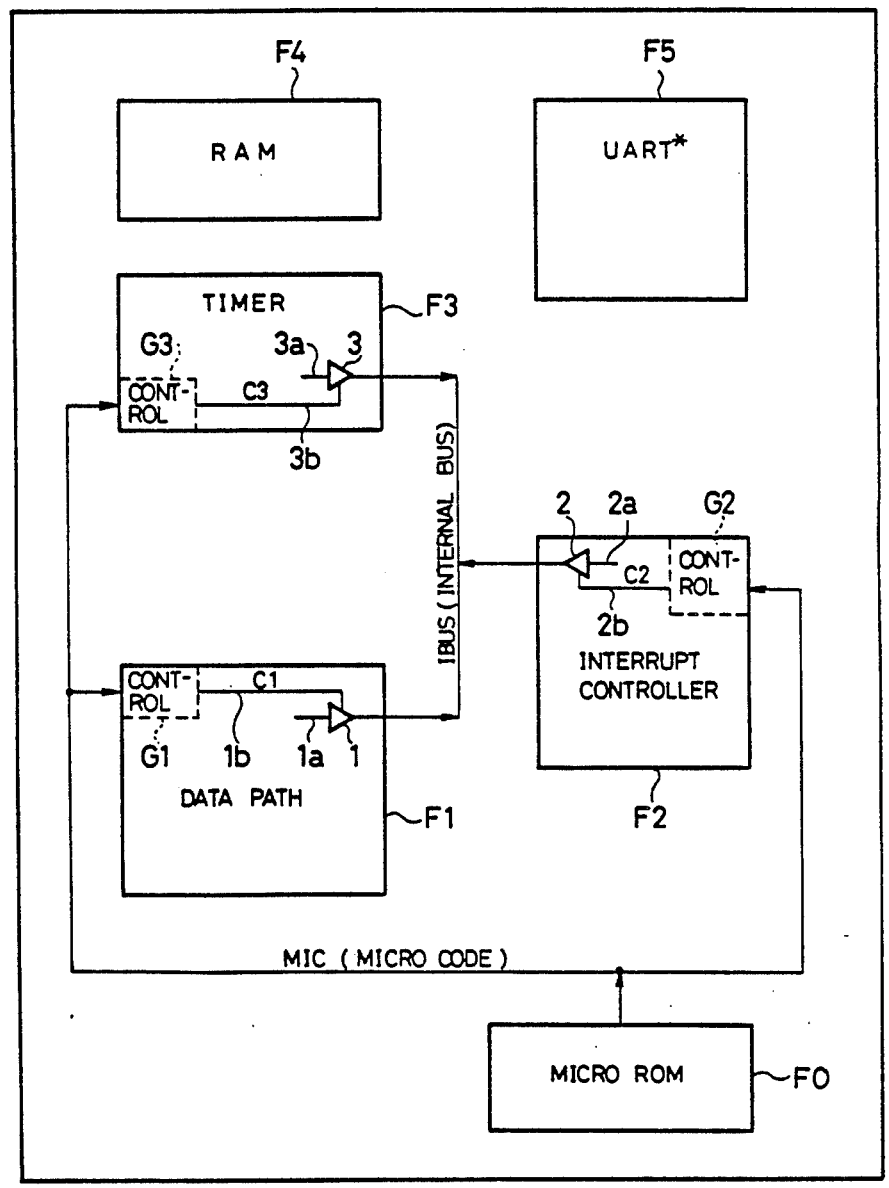

PRIOR ART  FIG. 6
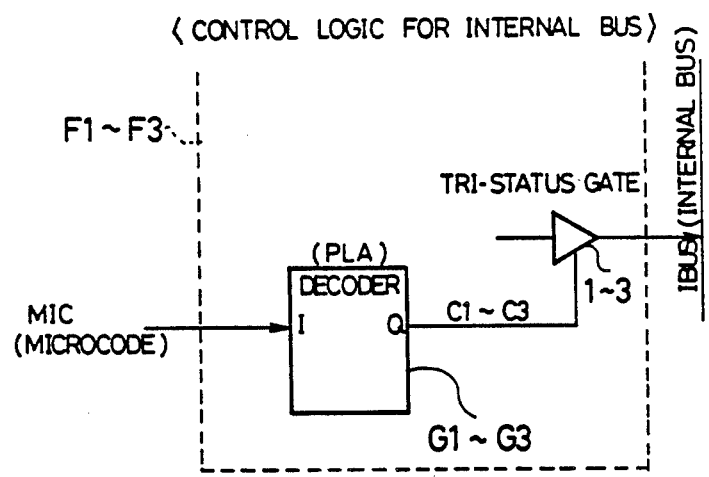

4,945,540

GATE CIRCUIT FOR BUS SIGNAL LINES

BACKGROUND OF THE INVENTION

1. Field of the Invention

The present invention relates to a gate circuit for bus signal lines used upon a LSI (Large Scale Integration) device. More particularly, the present invention relates to a gate circuit having a failure detecting circuit for making the choice of bus signal lines when a processing unit controls the gates of the gate elements.

2. Description of the Prior Art

FIG. 5 shows a gate circuit for bus signal lines with a tri-status bus circuit which has been broadly used upon a LSI device of a conventional microcontroller.

In the drawing, a gate circuit for bus signal lines includes the tri-status gates as gate elements 1-3, bus signal lines 1a-3a, gate signal lines 1b-3b, functional block of a microcontroller F0-F5 showing Micro Read Only Memory F0, Data Path F1, Interrupt Controller F2, Timer F3, Random Access Memory F4, and Universal Asynchronous Receiver Transmitter F5 respectively, inner bus IBUS which mutually connects with F0-F5, and control circuits G1-G3.

Referring to FIG. 5, the gate circuit for bus signal lines includes three tri-status gates.

These tri-status bus circuits supply the control signals C1-C3 to the gates of the said tri-status gates through the gate signal lines 1b-3b for making the choice of input signals provided through bus signal lines 1a-3a and control each of the states of the tri-status bus gates 1-3.

Then, for example, in the case that the control signals, C1-C3, are switched to the "1" state, the tri-status gates 1-3 turn to the "ON" state control micro code signal MIC, output from micro ROM F0, is designed not to provide two control signals at the same time and also not to turn a plurality of the tri-status gates 1-3 to the "ON" state. FIG. 6 shows an example of a PLA circuit consisting of control circuits G1-G3 as shown in FIG. 5. These circuits decode micro code signal MIC from micro ROM F0 and thereby output control signals C1-C3.

The above mentioned tri-status bus circuit does not include any detecting circuit for each of the tri-status gates 1-3. Any failure occurring in control circuits G1-G3 etc. provide error control signals C1-C3 to gate signal lines 1b-3c. Even when a plurality of tri-status gates 1-3 have turned to the "ON" state simultaneously, any failure that has not been detected, causes the problem that the reliability of data to be output to inner bus IBUS is decreased.

SUMMARY OF THE INVENTION

The primary object of the present invention is to provide a failure detecting gate circuit wherein the elements of each gate, for example, a tri-status gate, are under the control of the control signals.

Another object of the present invention is to provide a failure detecting circuit composed of a simple circuit though the number of gate signal lines which control the gate of the gate elements may be increased.

For the accomplishment of the above mentioned objects of the present invention, there is included a failure detecting circuit providing an output signal which indicates a failure when a plurality of the tri-status gates turn into "ON" state at the same time.

The above and other objects, features, and advantages of the invention will become more apparent from the following description when taken in conjunction with the accompanying drawings.

BRIEF DESCRIPTION OF THE DRAWINGS

FIG. 2 shows a relationship between the memorized contents of the ROM and the address when a failure detecting circuit is composed of ROM;

FIG. 5 shows an example of microcontroller LSI using a conventional gate circuit; and FIG. 6 is a block diagram showing an example of construction of a control circuit as shown in FIG. 5.

DESCRIPTION OF THE PREFERRED EMBODIMENTS

Figure 1:
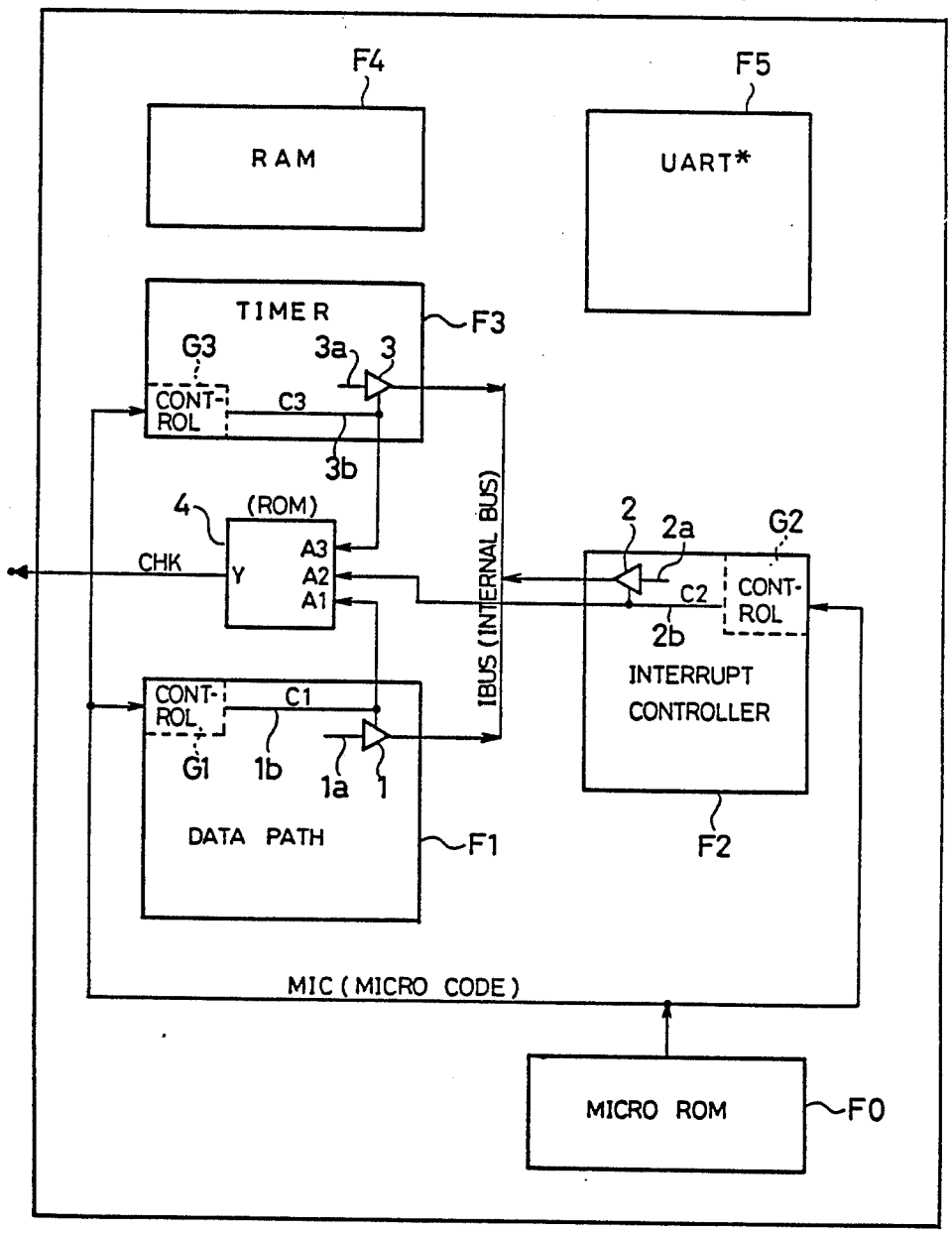
FIG. 1 shows an embodiment of a microcontroller LSI using the gate circuit of the bus signal lines of the present invention.

FIG. 1 shows an embodiment of a microcontroller LSI using the bus signal lines of the present invention.

In the drawing, the same reference numerals designate like parts. The reference numeral 4 is a memory composed of ROM as a failure detecting circuit, and the ROM is supplied control signals for the address signals C1-C3 to the input terminals A1-A3 for the tri-status gates. The ROM 4 as illustrated in FIG. 2, reads out its memorized contents at the address 0-7 in response to the address signals supplied to the input terminals A1-A3. When a plurality of the control signal C1-C3 are in the state "1", a plurality of the tri-status gates 1-3 go to the "ON" state, and output signal CHK indicating failure state "ON" is available to read out. For instance, at the time the control signal C1 and C2 on "1" state are respectively supplied to the input terminals A1 and A2. Control signal C3 are in the "0" state, the is supplied to the input terminal A3. The memorized content "1" at the sixth address is read out, so any failure in the processing unit is detected. Referring to the tri-status bus circuit illustrated in FIG. 1, when any failure has occurred on the control signal C1-C3 and a plurality of the tri-status gates 1-3 go to the "ON " state, output signal CHK "1" appears and a failure on control signals C1-C3 is detected.

According to the above description of the failure detecting circuit, the ROM is used in the detecting circuit. Even when the number of gate signal lines which gate the gate elements of tri-status gates has been increased, only the increase of the capacity of the ROM should be required and a simple failure detecting circuit may be obtained.

While there has been described what is, at present, considered to be a preferred embodiment of the present invention, it will be understood that the number of the tri-status gates may be available more than three.

Figure 3:
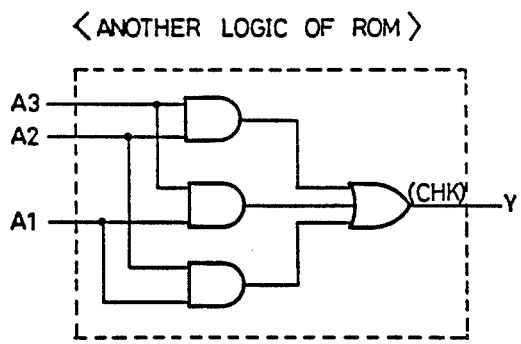
FIG. 3 shows another example of construction of a failure detecting circuit.

Although in the above mentioned description a ROM is used in a failure detecting circuit, it will also be understood that various modifications of the circuit may be available without using a ROM. FIG. 3 illustrates an example of the embodiment of logic element as a failure detecting circuit. In this circuit, when an input signal to either any two of input terminals A1-A3 goes to the "ON" state, output signal CHK is output. In short, a detecting function will be required to detect the "ON"

state of a plurality of the tri-status gates caused by control signals C1–C3.

Figure 4:
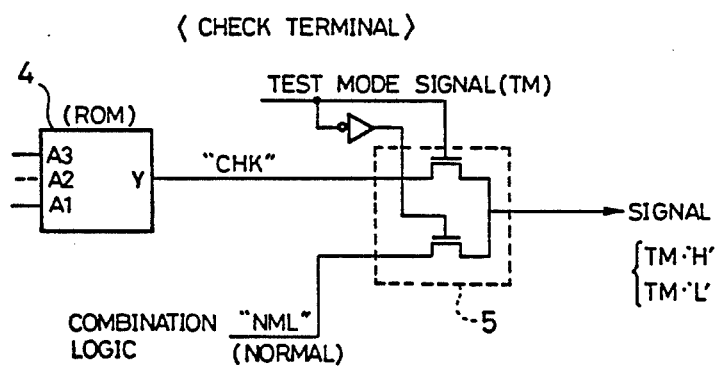
FIG. 4 illustrates an example of multiplexing signals indicating failure conditions with normal signals.

It is to be understood that in the above mentioned embodiment of the present invention, tri-status gates are used as the gate elements. The above embodiment is applicable to the other circuit elements, for instance, transfer gates, controlling the state of gate elements by supplying a control signal to the logic element. And as to an output signal, CHK, indicating a failure condition as shown in FIG. 4, both an output signal CHK and a normal signal of a microcontroller LSI are designed to be input to a multiplex circuit 5. The output of multiplex circuit 5 is the CHK signal which issued as a test mode signal, TM, in case of H-level signal. In case of L-level signal a normal signal is output. Consequently a failure in a LSI device of bus signal lines is to be detected without large additional increases in hardware.

What is claimed is:

1. In a bus gating circuit of the type for gating one of a plurality of input signals onto an internal bus line of a microcontroller, wherein the internal bus line provides for communication among a plurality of signal sources, with each input signal being connected to the internal bus line by a corresponding gate element that couples or isolates the corresponding input signal to or from the internal bus line depending on the active or inactive state of a control signal received by the gate element, a failure detection circuit for detecting an error condition in which two or more input signals are simultaneously coupled to the internal bus line, the failure detection circuit comprising:

circuit means responsive to the control signal lines for generating an error signal when more than one of the control signal lines are active, the error signal providing an indication of a control signal error, wherein the input signals are unchanged by the error signal; and a multiplexer having a first input line carrying the error signal, a second input line carrying a normal signal from a microcontroller, a selection input line to choose between the inputs, and an output to carry the signal output of the selected input.

2. A failure detecting circuit as claimed in claim 1 wherein the circuit means comprises a memory unit which provides a failure signal in case a plurality of control signals are supplied as address signals.

3. A bus gating circuit for internal bus lines as claimed in claim 1, wherein each gate element is composed of a tri-status gate.

4. A bus gating circuit for internal bus lines as claimed in claim 1, wherein each gate element is compsed of a transfer gate.

5. A bus gating circuit for internal bus lines as claimed in claim 2 wherein, the memory is composed of a ROM which stores a failure signal indicating that a failure condition exists at an address in the ROM, the failure signal being responsive to an address signal in the case that a plurality of control signals are address signals supplied to the ROM.

* * * * *